US007245272B2

(12) United States Patent
Shiuan et al.

(10) Patent No.: US 7,245,272 B2
(45) Date of Patent: Jul. 17, 2007

(54) CONTINUOUS GRAPHICS DISPLAY FOR DUAL DISPLAY DEVICES DURING THE PROCESSOR NON-RESPONDING PERIOD

(75) Inventors: Yi-Fang Michael Shiuan, Saratoga, CA (US); Xinwei Yang, Fremont, CA (US); Jinming Gu, Cupertino, CA (US); Iming Pai, San Jose, CA (US)

(73) Assignee: VIA Technologies, Inc., Taipei Hsien (TW)

( * ) Notice: Subject to any disclaimer, the term of this patent is extended or adjusted under 35 U.S.C. 154(b) by 398 days.

(21) Appl. No.: 10/640,423

(22) Filed: Aug. 12, 2003

(65) Prior Publication Data

US 2004/0075622 A1    Apr. 22, 2004

Related U.S. Application Data

(60) Provisional application No. 60/419,880, filed on Oct. 19, 2002.

(51) Int. Cl.
*G09G 5/00* (2006.01)
(52) U.S. Cl. .................. 345/2.2; 345/1.1; 345/3.1; 345/204; 345/212
(58) Field of Classification Search ............... 345/2.2, 345/1.1, 3.1, 204, 212
See application file for complete search history.

(56) References Cited

U.S. PATENT DOCUMENTS 5,886,689 A * 3/1999 Chee et al. .................. 345/212
6,021,256 A * 2/2000 Ng et al. ..................... 358/1.9

FOREIGN PATENT DOCUMENTS

JP    2002-165134    * 7/2002

* cited by examiner

*Primary Examiner*—Richard Hjerpe
*Assistant Examiner*—Leonid Shapiro
(74) *Attorney, Agent, or Firm*—J.C. Patents

(57) ABSTRACT

The present invention provides an image/graphics data display mechanism for continuously displaying image/graphics data on dual display devices of a computer that contains a Display FIFO and a system memory directly accessed by the computer's CPU, wherein at least one of the display devices is running in a low-resolution mode, the mechanism comprising: determining which of the display devices is running in the low-resolution mode; receiving a power saving signal from the CPU; requesting an access to the system memory, and pre-storing the image/graphics data for the low-resolution device into the Display FIFO; and triggering the CPU power saving process according to a display timing scheme of the other display device.

14 Claims, 6 Drawing Sheets

CONTINUOUS GRAPHICS DISPLAY FOR DUAL DISPLAY DEVICES DURING THE PROCESSOR NON-RESPONDING PERIOD

CROSS-REFERENCE TO RELATED APPLICATION

This application claims the priority benefits of U.S. provisional application titled" "Uninterrupted Graphics Display During The Period of Adjusting Processor's Operating Frequency And Power" filed on Oct. 19, 2002, Ser. No. 60/419,880. All disclosure of this application is incorporated herein by reference.

BACKGROUND OF THE INVENTION

1. Field of the Invention

The present invention relates to a computer graphic display, and more particularly, to a method for continuously displaying graphics or video data during a non-responding period of a central processing unit (CPU). Herein, the graphics or video data are stored in a system memory that can only be accessed via a built-in memory controller inside the CPU.

2. Description of the Prior Art

The computer is one of the most popular tools that have been closely involved in human daily lives. Almost all professions rely on the computer to make their work more efficient and easier. As the usage of computer grows even further, the need for a higher performance computer is likewise growing and getting bigger. More functions and more capacities are built into a single computer chip, and the clock speed of a central processing unit in a computer increases from the range of mega ($10^6$)/second to the range of giga ($10^9$)/second within few years. Not only the layout of computer hardware has become more complicated than before, but the coding of computer software application also has grown from millions of lines to billions of lines of code. The achievement of more functions, greater speed, and less power consumption becomes a challenge for the designing of a modern computer.

Conflicts are usually found in saving the consumption of power by a computer while trying to keep up its performance. Higher processing speed and more complex calculation always mean more power consumption. However, not all computer applications require high processing speed and consume large system resources all the time. Dynamically adjusting system operating clock and system resources, thereby reducing system power consumption based on the needs of a computer application is a clever design to keep the system performance high and save the system power consumption at the same time. The present invention identifies a solution to provide a continuous image/graphics display on a dual display devices computer system during a CPU power saving process. The following paragraphs first provide computer display background knowledge, illustrate a couple of common computer system display architectures by examples, and then introduce computer power saving mechanisms and computer system display problems caused by the power saving mechanisms.

With graphic-intensive applications, is a high quality of image data required to be displayed correctly and with precision on a monitor device without any blinking, jittering, or delays. An image with several megabytes data needs to be dumped onto a monitor device per second to accomplish a continuous error free video-on-demand application. Such a graphic-intensive application can be a high-end computer-aided drafting (CAD) application, a multimedia game, MPEG video playback, video conferencing, or one of many other real-time video applications. Typically, a graphic-intensive application contains a huge amount of image data that needs to be timely displayed onto a monitor device. Every complete screen of graphic information, known as a frame, has to be displayed precisely in time to avoid display blinking and jittering; as a result, the graphic processing mechanism needs to decode the image data fast enough. For instance, with a 640.times.480 pixels (horizontal.times.vertical), 32 bits true color, and 30 frames per second graphic application without compression, its image processor needs to process 36.864 megabytes image data per second to be able to display correctly. Moreover, as the typical resolution of a computer display has increased from 640.times.480 pixels to 800.times.600 pixels, 1024.times.768, 1280.times.1024, and beyond, and color information per pixel from 2 bits to 24 bits, 32 bits, and beyond, the processing speed and stability of an image processor also need to be increased multiplicatively.

Typically, to speed up the image processing speed, a computer relies on a graphics processing unit, or a standalone graphics card (GFX, also known as a video card, graphic accelerator card, or a display adapter, etc.) to do graphics display on a monitor device. A graphics card usually contains a specialized processor or processors that are tailor-made for graphic rendering, and a set of memory ranging from one, two, four, eight, or sixteen megabytes and up, so that image frames can be stored in the graphics card. Thus, the set of memory installed in a graphic card is commonly known as a frame buffer.

A graphics card or a graphics-processing unit can be built into a standalone chipset (and mounted on a card) as demonstrated in FIG. 1, or it can be integrated into an existing chipset as depicted in FIG. 2. Referring to FIG. 1, a computer system 10 comprises a CPU 11, a system chipset 12, a data-path chipset 13, a system memory 14, a graphics card (GFX) 15, a frame buffer 16, a first display device 17, a second display device 19, and a built-in memory controller 18 inside the system chipset 12. The system chipset 12 is commonly referred to as the North Bridge (NB), and the data-path chipset 13 is commonly referred to as the South Bridge (SB). Each of the display devices can be a Cathode Ray Tube (CRT) type, a liquid crystal display (LCD), or any other advanced monitors. As a contrast to FIG. 1, in FIG. 2, a graphics-processing unit (GFX) 27 is integrated into the NB 22, and the placements of a CPU 21, a System Memory 24, a Memory Controller 26, a SB 23, a NB 22, and Display Devices 25, 28 are similar to FIG. 1.

Usually, graphics information that is going to be displayed onto the display device is first stored in the system memory, then transferred to a first-in-first-out (FIFO) video memory. The FIFO display mechanism will make a request to access system memory to receive the graphic information. The FIFO display mechanism may be appreciated by a water tank analogy. Similar to water draining out from the bottom of a water tank at a constant rate and refilling from the top of the water tank occasionally, the FIFO display mechanism dumps image data to the frame buffer of the display device at an invariant rate, and receives image data from the system memory every so often. Both the standalone graphics processing unit (as depicted in FIG. 1) and the on-chipset graphics processing unit (as depicted in FIG. 2) can directly access the system memory through the memory controller in the NB. In other words, the request of a system memory access can be made by the graphics processing unit (or the graphics card) without going through the CPU.

In addition to the computer system architectures demonstrated in FIG. 1 and FIG. 2, there are other computer system architectures in use. For instance, two of those computer system architectures are presented in FIG. 3 and FIG. 4. In FIG. 3, a computer system architecture 30 is similar to the standalone GFX computer system 10 shown in FIG. 1 except that the system memory 34 is directly connected to a CPU 31 via a built-in memory controller 38. As the same for FIG. 4 and FIG. 2, both computer system architectures have their graphics processing units built into the North Bridges, but in FIG. 4, the memory controller 46 is inside a CPU 41 and a system memory 44 is directly coupled to the CUP 41 via the built-in memory controller 46. Note that with the computer system architectures sketched in FIG. 3 and FIG. 4, a system memory access requested by the graphics processing units (GFXs) has to go through not only the North Bridges but also the CPUs.

The increase of CPU workload often demands an increase in power consumption and results in a shorter battery life. The increased power consumption may cause a fatal problem to an application running on a mobile computer unit or a laptop computer. As a consequence, a variety of power saving techniques is introduced to the design of modern computers. A couple of power saving techniques are described as follows. When a CPU idles for a predetermined period of time, the CPU clock speed is reduced, and the CPU power supply is turned off. Furthermore, instead of turning the CPU on and off, a mechanism that detects the power consumption level of an application several times every second and self-adjusts the CUP clock rate and power supply level to reduce power consumption is built into a computer. As a result, with the use of the power saving techniques, a battery can last longer and the capacity of a battery may be reduced to achieve the same performance.

Typically, a few microseconds (μsec) to tens of μsec is required to process the power saving mechanism, for instance, to detect the power consumption level of an application so that the CPU clock rate can be reduced. During the execution of power saving mechanism, the CPU is completely idle and waits for the next alternative CPU clock rate to operate. Upon the CPU idle period, the graphics processing unit or the graphics card presented in FIG. 3 and FIG. 4 cannot access the memory controller that is built inside the CPU to obtain the required image/graphics data from the system memory. The present invention provides a breakthrough solution to the conflict between power saving and continuous image/graphics data display in a modern computer design.

SUMMARY OF THE INVENTION

Accordingly, the purpose of the present invention is to provide a technique to continuously display graphics or video data on dual display devices during a non-responding period of a CPU while executing a power saving process. This technique is particularly useful for a computer system having its system memory controller built inside the CPU. Since the system memory controller is integrated into and the system CPU, a data transmission break will occur between the system memory and a graphics-processing unit as the CPU falls into a non-responding period for power saving purposes or other reason. With the present invention, a continuous graphics or video display on two display devices is guaranteed during the non-responding period of the CPU while executing the power saving process.

In the first case, the present invention implements continuous image/graphics data display during the non-responding period of the CPU that is equipped with two display devices, one operates in a low-resolution mode the other in a high-resolution mode, or both in low-resolution mode. Furthermore, the system memory of the computer system is directly accessed by the CPU, and a Display FIFO is good for the use of the low-resolution device only during the non-responding period of the CPU. The procedure of the mechanism of the present invention comprises: determining which of the display devices is running in the low-resolution mode; receiving a power saving signal that sends from the CPU and indicates a request for executing the power saving process by the CPU; pre-storing the image/graphics data for the low-resolution display device in the Display FIFO by requesting an access to the system memory; and triggering the CPU power saving process according to a display timing scheme of the other display device.

According to the preferred embodiment of the present invention, wherein the step of triggering the CPU power saving process consists of: detecting a horizontal or a vertical synchronization signal of the other display device, and executing the power saving process within a horizontal blank period (HBP) or a vertical blank period (VBP) of the other display device.

According to the preferred embodiment of the present invention the step of triggering the CPU power saving process can further comprise: obtaining the length of a power saving process period (PSPP) and the length of the HBP of the other display device, comparing the length of the HBP of the other display device to the length of PSPP, and executing the power saving process within the VBP of the other display device if the length of the HBP is less than the length of PSPP.

In addition to the computer system architecture of the previous case, a computer system may also be equipped with a Display FIFO for each of the two display devices. In the later case, the present invention will first examine the size of the Display FIFO of a high-resolution display device to determine whether the Display FIFO has the capacity to hold the high-resolution device image/graphics data required during the power saving process. If the test result is positive, the present invention will utilize both the Display FIFOs to achieve nonstop display on both display devices during the power saving process. Otherwise, if the test result is negative, the present invention will employ the mechanism addressed in the previous case to accomplish the continuous display task. The procedure of the later implementation of the present invention comprise: determining which of the display devices is running in low-resolution mode; receiving a power saving signal from the CPU; pre-storing the image/graphics data for the low-resolution display device in its corresponding Display FIFO; obtaining a display resolution of the other display device (a high-resolution display device), the size of the Display FIFO of the high-resolution display device, and a length of the power saving process period (PSPP); and if the Display FIFO of the high-resolution display device has the capacity for pre-storing the image/graphics data for nonstop display during the power saving process period, pre-storing the required image/graphics data into the Display FIFO of the high-resolution display device; or, triggering the CPU power saving process according to a display timing scheme (HBP or VBP) of the high-resolution display device.

According to the preferred embodiment of the present invention, wherein the step of triggering the CPU power saving process consists of: detecting a horizontal or a vertical synchronization signal of the high-resolution device, and executing the power saving process within a horizontal blank period (HBP) or a vertical blank period (VBP) of the high-resolution display device.

According to the preferred embodiment of the present invention, the step of triggering the CPU power saving process can further comprise: obtaining a length of the horizontal blank period (HBP) of the high-resolution display device; comparing the length of the HBP of the high-resolution display device with the length of power saving process period (PSPP), execute the power saving process within the HBP of the high-resolution display device if the length of the HBP of the high-resolution display device is larger than the length of PSPP; or execute the power saving process within the VBP of the high-resolution display device if the length of the HBP is less than the length of PSPP.

The present invention successfully provides an image/graphics data display mechanism for continuously displaying image data on dual display devices of a computer that contains one or two sets of Display FIFO for the display devices and a system memory directly accessed by the computer's CPU during the CPU's non-responding period, wherein at least one of the display devices is running in a low-resolution mode.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENT

Figure 1:
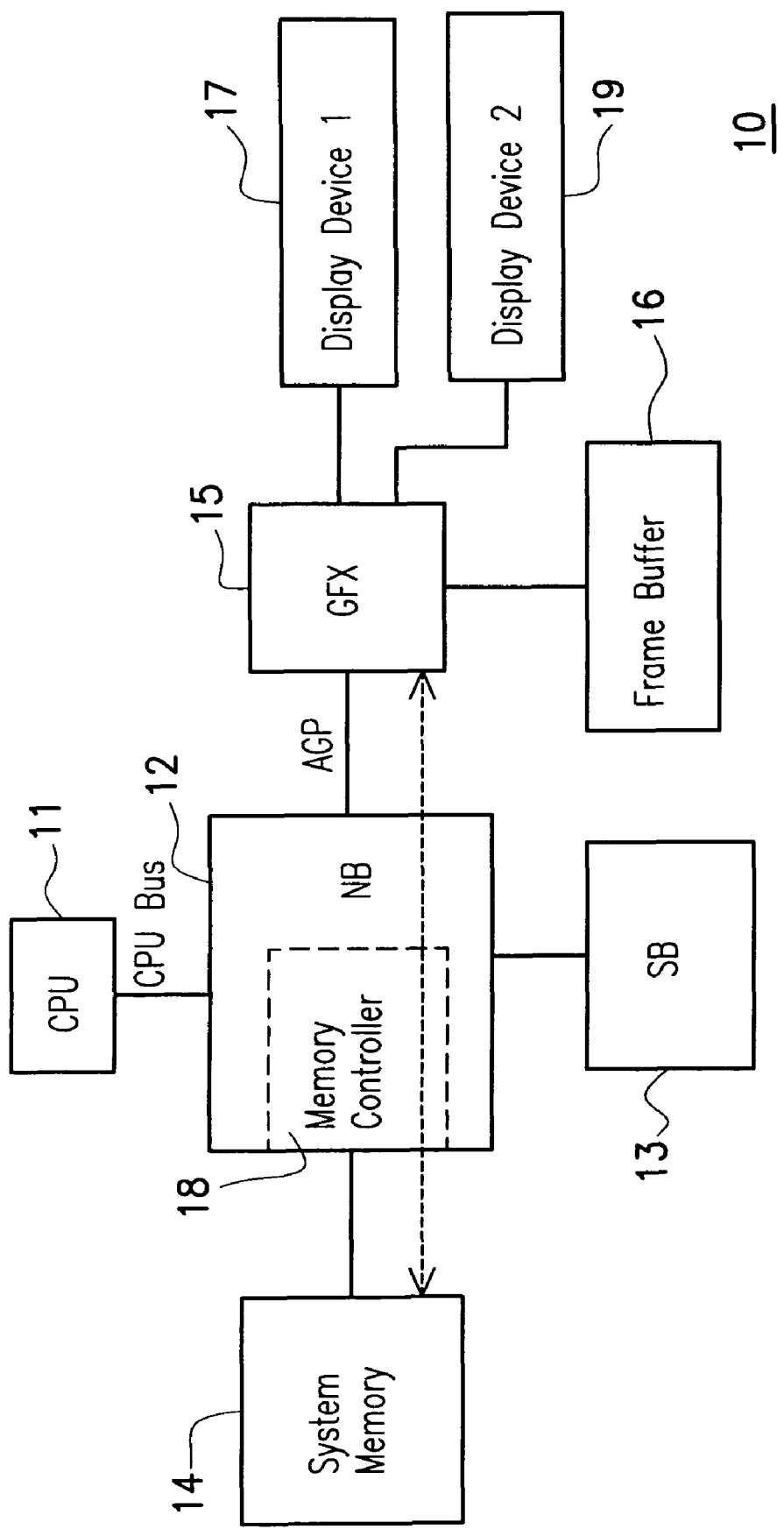
FIG. 1 is a block diagram depicting a conventional discrete computer system in which its graphic card (GFX) 15 is standalone from the system's North Bridge (NB) 12.
Figure 2:
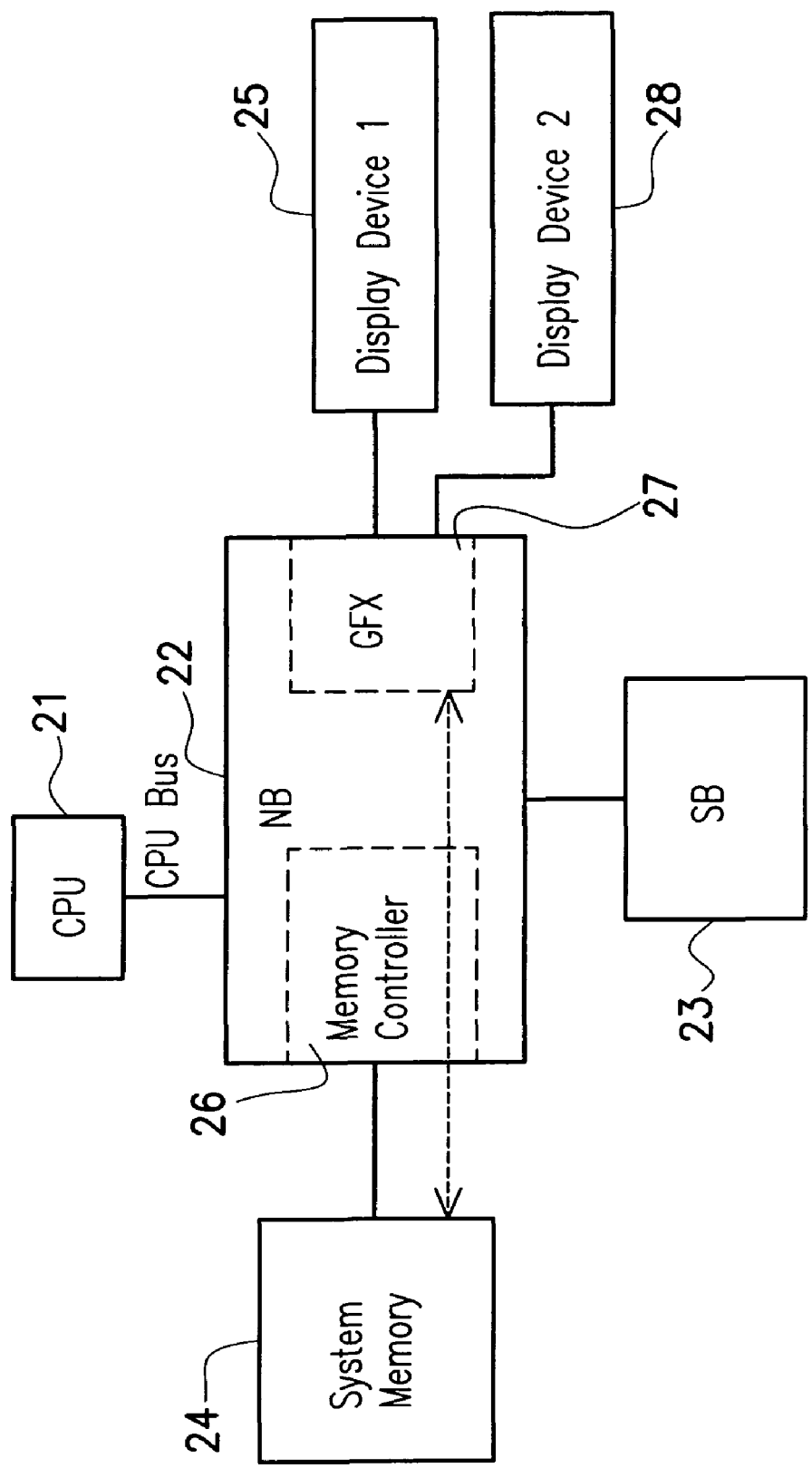
FIG. 2 is a block diagram that demonstrates a conventional on-chipset computer system in which its graphic processing unit (GFX) 27 is built inside the system's North Bridge (NB) 22.

Reference will now be made in detail to the present preferred embodiments of the invention, examples of which are illustrated in the accompanying drawings. Wherever possible, the same reference numbers are used in the drawings and the description to refer to the same or like parts.

In practice, a computer system has limited system memory bandwidth to run more than one display device in high resolution at the same time. In the case of dual display devices hooked up to a computer system, a common setup to the computer system is for one of them to run in a high-resolution mode and the other to run in a lower resolution mode, or both of the display devices to run in low-resolution mode. In dual display devices scheme, the horizontal and vertical frequencies of two different display devices may not be the same; thus, the synchronization/blank periods of the two devices will not take place at the same time. Even if their frequencies are the same, both display devices may not run synchronously. Possible phase differences of synchronization may exist between the two devices. The present invention exploits Display FIFO to supply the image/graphics data that the lower resolution display device required during a non-responding period of the CPU while executing a power saving process, and allows this non-responding period to occur within a synchronization/blank period of the other display device (typically the high-resolution display device). When the CPU power saving process takes place, the two display devices rely on different technologies to have continuous display.

Typically, with a built-in video memory, the Display FIFO can hold 4 μsec of high-resolution image data. With the size of Display FIFO that can store 4 μsec of high-resolution image/graphics data, a much longer low-resolution image data (typically longer than 14 μsec) can be stored in the same Display FIFO. The amount of 14 μsec image/graphics data is long enough to support a nonstop display during the CPU power saving process (which normally takes a period of less than 14 μsec). While the low-resolution display device consumes the image/graphics data stored in the Display FIFO, the high-resolution display device is in its synchronization/blank period that does not consume any image/graphics data.

Accordingly, the present invention can be implemented in two different Display FIFO capacities of a graphic processing unit in a computer. Commonly, the capacity of a Display FIFO is enough for pre-storing the required low-resolution image data during CPU's power saving process, but it is not big enough for the use of both high and low resolution devices. To an extreme Display FIFO layout, two sets of Display FIFOs are designed to hold the image/graphics data for both high- and low-resolution devices requirement during CPU power saving process.

Figure 3:
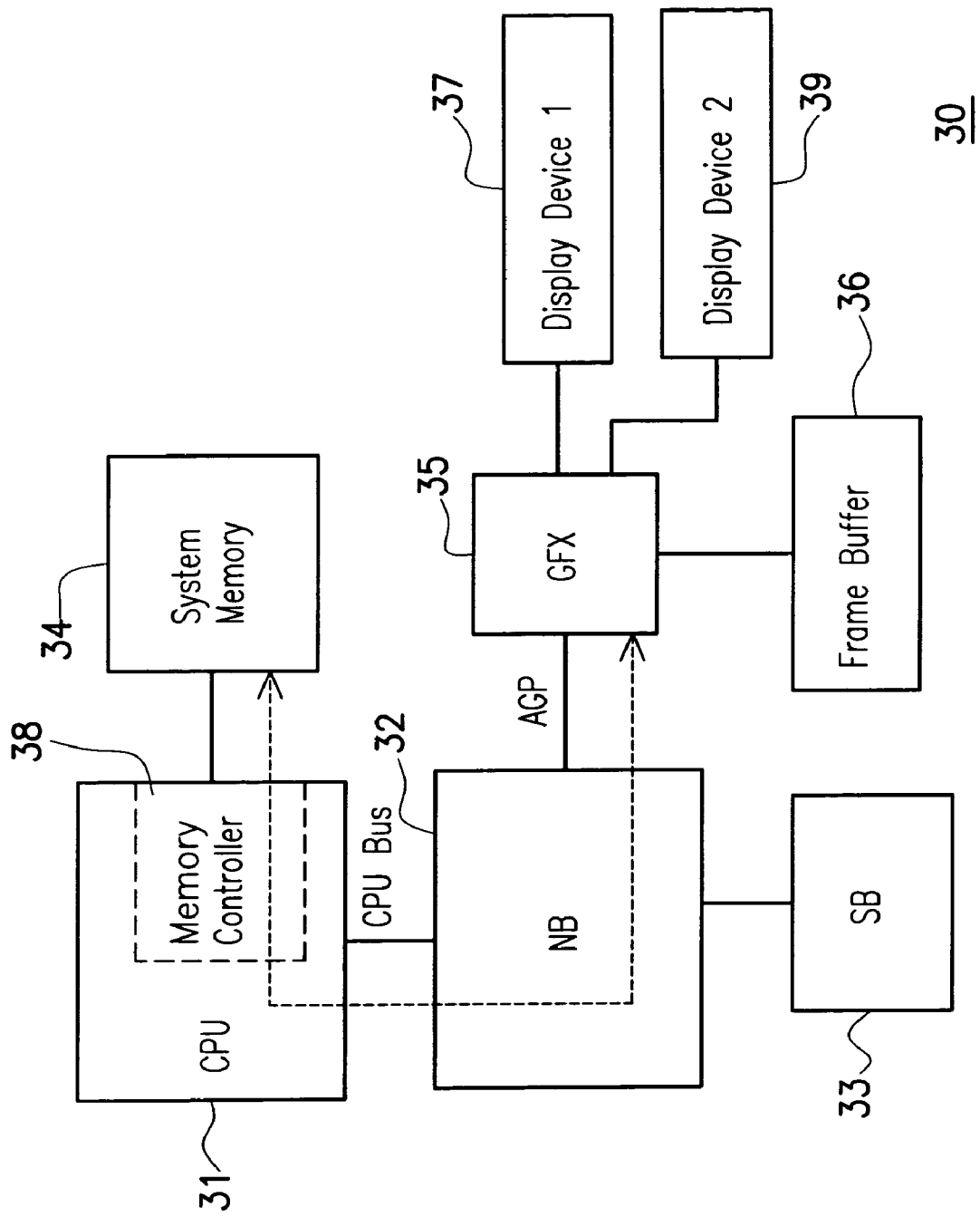
FIG. 3 is a block diagram showing a conventional computer system in which the GFX is discrete from the system's North Bridge, and with the system's memory controller built inside the system CPU, the system memory is directly accessed by the system CPU.
Figure 4:
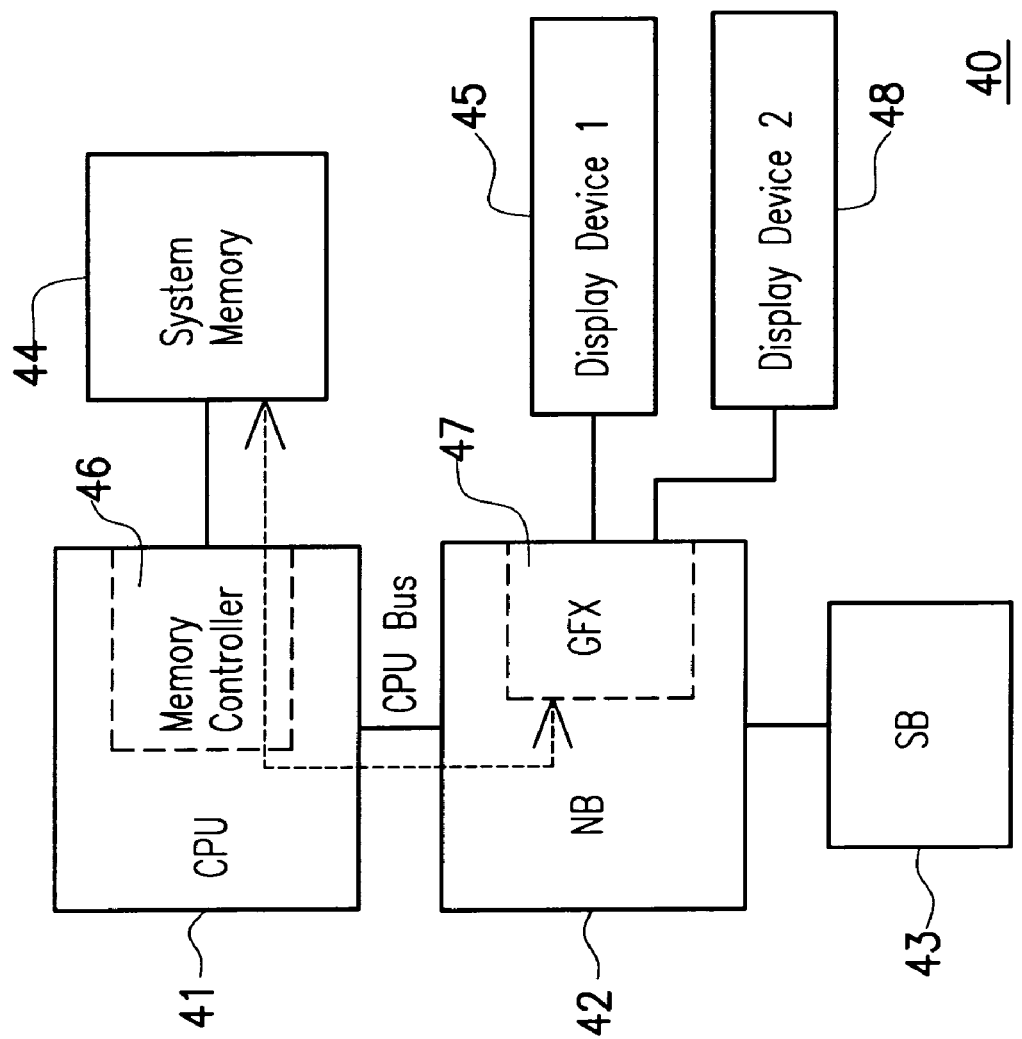
FIG. 4 is a block diagram sketching a compact computer system in which a system graphic processing unit is built inside the system North Bridge, and a system memory controller is inside a system CPU so that a system memory is directly accessed by the system CPU.
Figure 5:
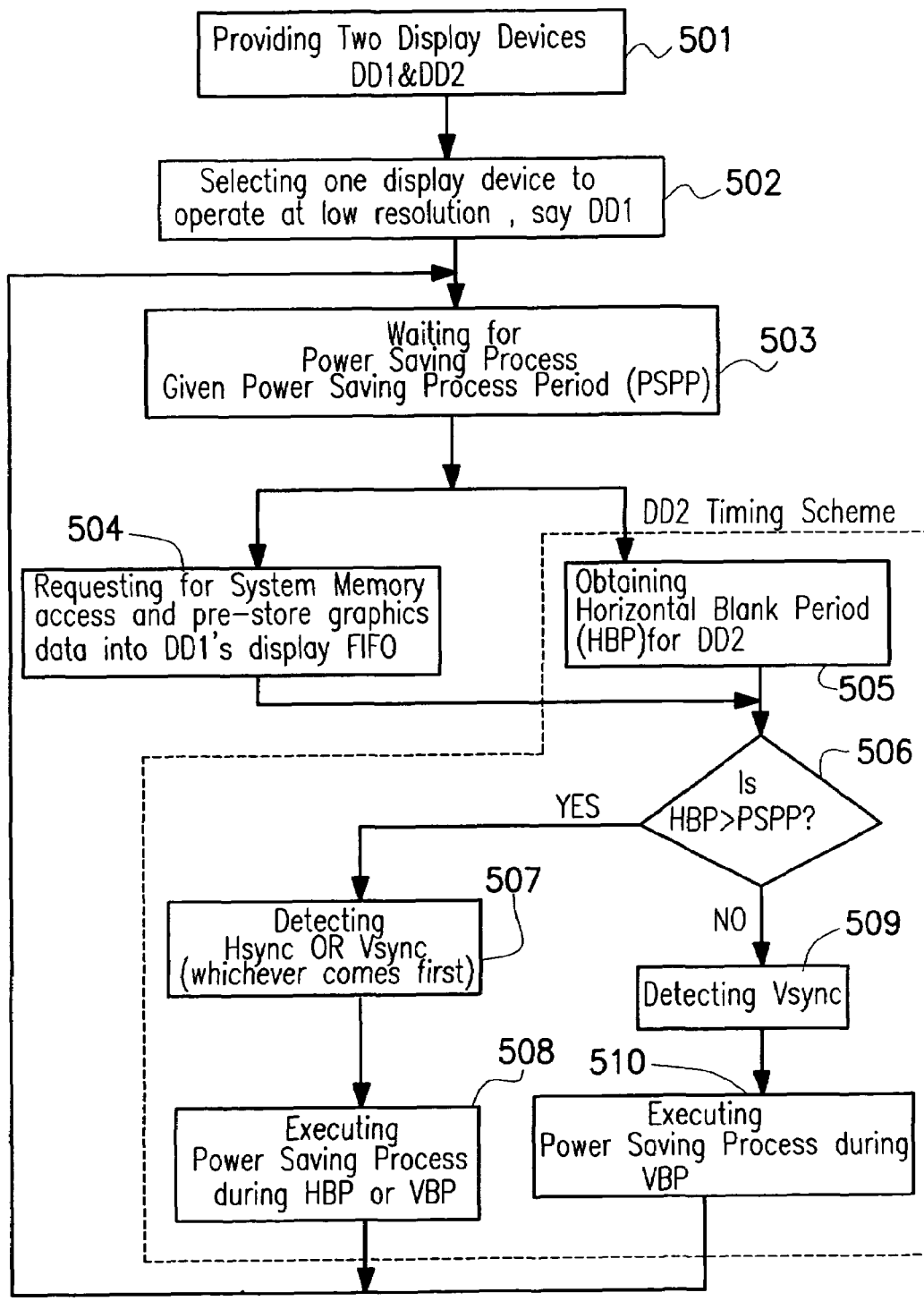
In FIG. 5, a flow chart diagram demonstrates an operation flow of a preferred embodiment of the present invention.

FIGS. 3, 4, and 5 are used to demonstrate the first preferred embodiment of the present invention. The block diagrams in FIGS. 3 and 4 depict two display devices are connected to a computer system. A hardware layout or a hardware design of a dual-display computer system can vary from one to the other without loss its dual-display functionality. Regardless a computer system's hardware layout, the present invention provides a graphics data display mechanism for continuously displaying graphics data on dual display devices of a computer system that contains a Display FIFO and a system memory directly accessed by the computer's CPU, wherein at least one of the display devices is running in a low-resolution mode. For instance, the present invention can be utilized in the computer systems presented in FIG. 3 and FIG. 4 to have a nonstop image display during the system CPUs' non-responding periods for executing power saving process. The mechanism that the present invention provides works well in the case of a graphic-processing unit (GFX) outside a system's North Bridge as depicted in FIG. 3, and it works equally well in the case of a graphic-processing unit inside a system's North Bridge as depicted in FIG. 4. Mainly, the present invention provides a solution to prevent a graphics data transmission break due to a system CPU power saving process of a dual-display computer system that has its system memory directly accessed by its CPU. In a sense, the system CPU works like a bridge connecting the system memory and the graphic-processing unit together. As the CPU falls into a non-responding period, the connection between the system memory and the system graphic-processing unit breaks. Without being equipped with the present invention, the graphics data transmission breaks between the system memory and the graphics processing unit (GFX), therefore breaking the continuous image display on the dual display devices when the CPU falls into a non-responding period when executing the power saving process. Apparently, the hardware layout of a dual-display computer system can vary along broad lines; so long as its system memory is directly accessed by its CPU and a system power saving process causes the system CPU to fall into a non-responding period, thereby breaking the image/graphics data transmission between the system memory and the graphics-processing unit. The present invention will provide a continuous graphics data display during the system power saving process of the dual-display computer system.

In FIG. 5, a flow chart diagram demonstrates the mechanism of the first embodiment of the present invention. In the figure, two display devices DD1 and DD2 are provided in step 501. One of the two devices is selected to run in a low-resolution mode, step 502; let's say DD1 is running in the low-resolution mode and DD2 is running in a high-resolution mode. The mechanism waits for receiving a power saving signal, which is a request for executing the power saving process from the CPU, and the value of a power saving process period (PSPP) is pre-determined by the CPU system, step 503. In step 504 and 505, once the CPU detects the necessity to execute the power saving process, CPU sends a request to the graphics unit (GFX). During this period, the CPU of the computer system continues to operate in normal mode and wait for the acknowledgment of power saving process from the graphics unit. The CPU system and the graphics unit continue to access the system memory and pre-stores all the image/graphics data that DD1 needs during the PSPP into a Display FIFO before the power saving process is allowed to take place. In parallel (step 505), based on the DD2 resolution, a vertical blank period (VBP) of DD2 and a horizontal blank period (HBP) of DD2 are determined. The mechanism then follows a timing scheme on DD2 after the image/graphics data that DD1 needs during the PSPP is pre-stored into the Display FIFO. Two implementations of the timing scheme are presented in FIG. 5 that are the two branches from step 506 to step 507 and step 509. If the HBP of DD2 is larger than PSPP, the first implementation (step 507 and 508) takes the role to complete the power saving process. Once a horizontal or a vertical synchronization signal of DD2 is detected (whichever comes first) in step 507, the graphics unit sends an acknowledgment to CPU system to allow the power saving process happening (step 508). After the acknowledgment is received, the CPU system executes the power saving process immediately and takes PSPP long to finish. During the power saving process, the Display FIFO of DD1 holds enough pre-stored image/graphics data to be displayed on DD1. Also the DD2 is in horizontal blank period (or vertical blank period) and doesn't need any image/graphics data to be displayed. Because the HBP of DD2 is larger than the PSPP, the power saving process will be finished before the end of horizontal blank period of DD2. After the power saving process, the CPU system resumed to access system memory data to DD1 and DD2, and CPU system try to detect the next power saving process (the flow goes back to step 503). In this context, the terms, PSPP, HBP, VBP, horizontal synchronization signal, and vertical synchronization signal, are signals commonly understood by those of ordinary skill in the art. For instance, the horizontal synchronization signal is a signal given to the display device telling it to stop drawing the current horizontal line, and start drawing the next line. The vertical synchronization signal is a signal given to the display device telling it to start tracing a new frame from the upper-left corner (for CRT monitors only) of the display screen. The horizontal blank period is the period of time required to start a new line. The vertical blank period is the period of time required to start a new frame.

Back to step 506, if the length of the HBP of DD2 is shorter than or equal to the length of the PSPP, the second implementation of the timing scheme plays the role to complete the power saving process, that are the steps 509 and 510. Instead of executing the power saving process during horizontal blank as in the first implementation, the power saving process is executed during only the vertical blank period in this second implementation. Once a vertical synchronization signal of DD2 is detected in step 509, the graphics unit (GFX) sends an acknowledgment to the CPU system to allow the power saving process happening (step 510). After the acknowledgment is received, the CPU system executes the power saving process immediately and takes PSPP long to finish. During the power saving process, the Display FIFO of DD1 holds enough pre-stored image/graphics data to be displayed on DD1. Also the DD2 is in vertical blank period and doesn't need any image/graphics data to be displayed. Because the VBP of DD2 is always larger than the PSPP, the power saving process will be finished before the end of vertical blank period of DD2. After the power saving process, the CPU system resumed to access system memory data to DD1 and DD2, and the CPU system try to detect the next power saving process (the flow goes back to step 503).

The horizontal and vertical synchronization signals are provided by the graphics processing unit (or the graphics card) and are used for synchronizing the display device to operate exactly synchronous to the graphics processing unit (or the graphics card), respectively during the horizontal and vertical blank period. Moreover, the graphics processing unit (or the graphics card) also provides two other signals, a horizontal blank signal and a vertical blank signal, which can be used to replace the above mentioned horizontal and vertical synchronization signals respectively.

Figure 6:
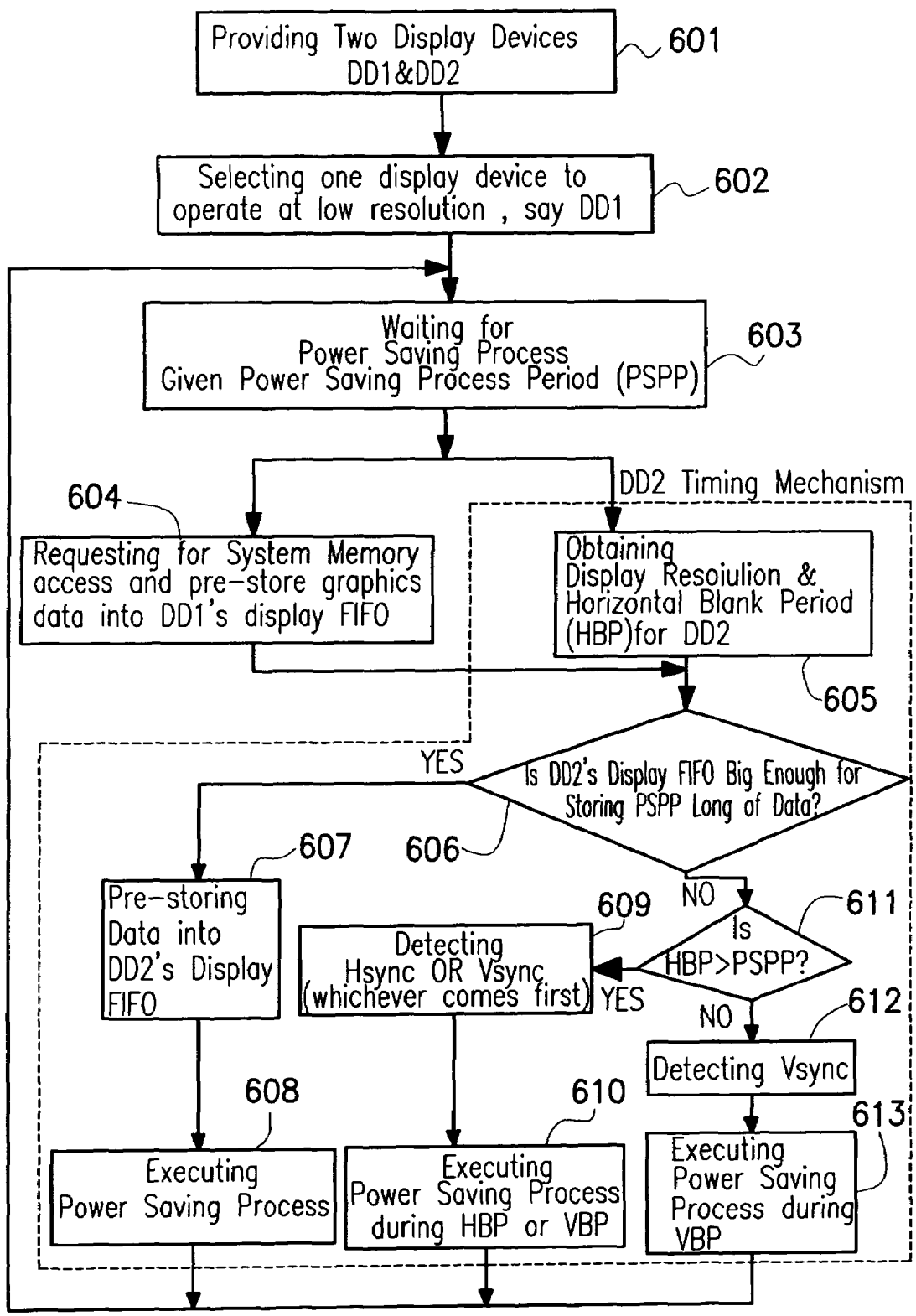
In FIG. 6, a flow chart diagram depicts an operation flow of another preferred embodiment of the present invention.

A flow chart diagram of the second preferred embodiment of the present invention is depicted in FIG. 6. In addition to the hardware setup of the computer system in the first preferred embodiment of the present invention, a computer system equipping with a Display FIFO for each of the display devices, DD1 and DD2, is presented in the second preferred embodiment. A detail description of the second preferred embodiment is as follows. First, two display devices, DD1 and DD2, are provided in step 601. Second, select one of the display devices to run in low-resolution mode, for instance DD1; and the other display device to run in high-resolution mode, for instance DD2 (step 602). It is also possible for both of the display devices, DD1 and DD2, to run in low-resolution mode. The mechanism waits for a power saving process signal, which is a request for executing the power saving process from the CPU, and pre-determines the value of a power saving process period (PSPP) by the CPU system in step 603. The same occurs in the pre-storing DD1 image/graphics data procedure as in the first preferred embodiment; the mechanism requests an access to a system memory to pre-store DD1 image/graphics data that is required during the power saving process into DD1's Display FIFO in step 604. While pre-storing DD1 image/graphics data, the present invention implements a timing mechanism on DD2 to trigger the power saving process when the DD1 image/graphics data pre-storing task finishes. The timing mechanism over DD2 comprises: first, acquiring a display resolution and based on the display resolution of DD2 a horizontal blank period (HBP) of DD2 is determined in step 605; then determining whether the capacity of DD2's Display FIFO is sufficient to pre-store DD2's image/graphics data that is required during the power saving process (step 606); if the DD2's Display FIFO is capable of holding the required image/graphics data, the mechanism then pre-stores DD2's image/graphics data in its corresponding Display FIFO (step 607). Once the required image/graphics data are pre-stored in both the DD1 and DD2's Display FIFO, the graphics unit sends an acknowledgment to the CPU system to allow the power saving process happening (step 608). After the acknowledgment is received, the CPU system executes the power saving process immediately. During the power saving process, both the Display FIFOs of DD1 and DD2 hold enough pre-stored image/graphics data to be displayed. After the power saving process, the CPU system resumed to access system memory data to DD1 and DD2, and the CPU system try to detect the next power saving process (the flow goes back to step 603). However, if DD2's Display FIFO is not sufficient to hold all the image/graphics data during the power saving process, the mechanism implementing the same DD2 timing scheme in the first preferred embodiment in which procedures 506, 507, 508, 509, and 510 in FIG. 5 directly map to procedures 611, 609, 610, 612, 613 in FIG. 6, recalling that two possible implementations can be implemented in the DD2 timing scheme as described in the first preferred embodiment of present invention in the previous paragraphs. That the Display FIFO is sufficient for pre-storing image/graphics data during the power saving process means that the image/graphics data stored in the Display FIFO are larger than or equal to the data dumped to its corresponding display device during the system power saving process. Upon the completion of the power saving process, the second embodiment of the present invention returns to step 603, waiting to receive the next request for executing the power saving process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A graphics display method for continuously displaying graphics data on dual display devices of a computer system that contains a display FIFO and a system memory directly accessed by a memory controller embedded in a CPU, wherein at least one of the display devices is running in a low-resolution mode, the method comprising:

determining which of the display devices is running in the low-resolution mode;

receiving a request sent to a graphic unit from the CPU, said request indicating the CPU detects the necessity to execute a power saving process;

pre-storing the graphics data for the low-resolution display device into the display FIFO by requesting an access to the system memory by the memory controller embedded in the CPU; and triggering the power saving process by sending an acknowledgement from the graphic unit to the CPU in response to the request according to a display timing scheme of the other display device.

2. The method of claim 1 wherein the step of triggering the power saving process according to the display timing scheme comprising:

detecting a horizontal or a vertical synchronization signal, whichever comes first, of the other display device; and executing the power saving process within a horizontal blank period (HBP) or a vertical blank period (VBP) of the other display device.

3. The method of claim 2 further comprising:

obtaining a length of a power saving process period (PSPP) from the CPU and determining a length of the HBP of the other display device;

comparing the length of the HBP of the other display device to the length of PSPP; and executing the power saving process within the VBP of the other display device if the length of the HBP of the other display device is less than the length of PSPP.

4. The method of claim 2 wherein the horizontal synchronization signal is used for synchronizing the display device with its graphic processing unit during the horizontal blank period (HBP).

5. The method of claim 4 wherein the horizontal blank period is provided by the graphic-processing unit.

6. The method of claim 2 wherein the vertical synchronization signal is used for synchronizing the display device with its graphic processing unit during the vertical blank period (VBP).

7. The method of claim 6 wherein the vertical blank period is provided by the graphic-processing unit.

8. A graphics display method for continuously displaying graphics data on dual display devices of a computer system that contains a display FIFO for each of the display devices and a system memory directly accessed by a CPU, wherein at least one of the display devices is running in a low-resolution mode, the method comprising:

determining which of the display devices is running in the low-resolution mode;

receiving a request sent to a graphic unit from the CPU, said request indicating the CPU detects the necessity to execute a power saving process;

pre-storing the graphics data for the low-resolution display device into its corresponding display FIFO by requesting an access to the system memory;

obtaining a display resolution of the other display device, the size of the display FIFO of the other display device, and a length of a power saving process period (PSPP); and if the display FIFO of the other display device is big enough for pre-storing the graphics data, requesting an access to the system memory, and pre-storing the graphics data into the display FIFO of the other display device then triggers the power saving process; else triggering the power saving process by sending an acknowledgement from the graphic unit to the CPU in response to the request according to a display timing scheme of the other display device.

9. The method of claim 8 wherein the step of triggering the power saving process according to the display timing scheme of the other display device comprising:

detecting a horizontal or a vertical synchronization signal, whichever comes first, of the other display device; and executing the power saving process within a horizontal blank period (HBP) or a vertical blank period (VBP) of the other display device.

10. The method of claim 9 further comprising:

determining a length of the horizontal blank period (HBP) of the other display device from the display resolution of the other display device;

comparing the length of the HBP of the other display device to the length of the PSPP; and executing the power saving process within the VBP of the other display device if the length of the HBP is less than the length of the PSPP.

11. The method of claim 9 wherein the horizontal synchronization signal is used for synchronizing the display device with its graphic processing unit during the horizontal blank period (HBP).

12. The method of claim 11 wherein the horizontal blank period is provided by the graphic-processing unit.

13. The method of claim 9 wherein the vertical synchronization signal is used for synchronizing the display device with its graphic processing unit during the vertical blank period (VBP).

14. The method of claim 13 wherein the vertical blank period is provided by the graphic-processing unit.

* * * * *